R. F. LANDIS.
VALVE CONTROL AND RELEASING DEVICE.
APPLICATION FILED MAR. 13, 1919.
1,336,084.
Patented Apr. 6, 1920.
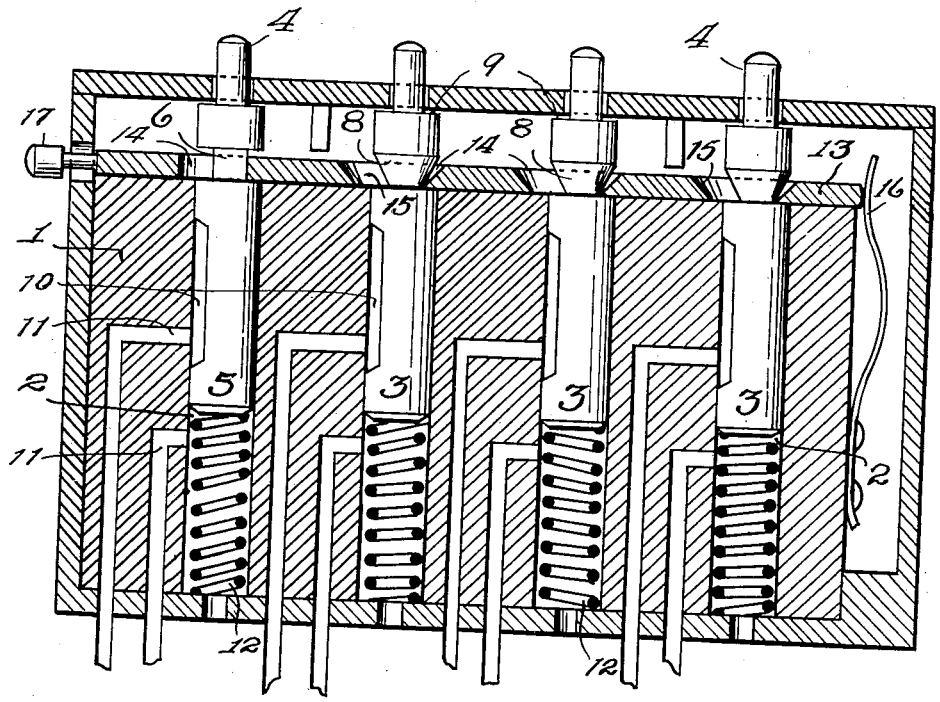
Raymond F. Landis,
Inventor

UNITED STATES PATENT OFFICE.

RAYMOND F. LANDIS, OF READING, PENNSYLVANIA.

VALVE CONTROL AND RELEASING DEVICE.

1,336,084.  Specification of Letters Patent.  Patented Apr. 6, 1920.

Application filed March 13, 1919. Serial No. 282,385.

*To all whom it may concern:*

Be it known that I, RAYMOND F. LANDIS, a citizen of the United States, residing at Reading, in the county of Berks and State of Pennsylvania, have invented certain new and useful Improvements in Valve Control and Releasing Devices, of which the following is a specification.

This invention relates to improvements in valve control and releasing devices, such as are shown and described in U. S. Letters Patent #1,298,227 issued to me under date of March 25th, 1919.

The device is applicable to many uses and I have shown it in substantially the simple form it will take when applied to an automobile, for the purpose of shifting rods to accomplish the change of gears.

My present invention relates solely to a means for preventing the accidental actuation of the reversing mechanism.

In the drawing forming a part of this application, I have shown, in vertical sectional view, a portion of the body in which the actuating valves are located, and in which they move vertically, to accomplish their intended object.

In the said drawing, the numeral 1 designates the body of the valve holding device, having a plurality of vertical cylindrical openings 2 in each of which is located a cylindrical valve 3—5, each of which is formed with an upwardly projecting head 4 providing means for operating the valves manually. Each of the valves, with one exception, is formed with an annular tapered groove 8 near its upper end, and each valve is formed with a longitudinal groove 10 about midway of its length, which is adapted, when the valve is in lowered position, to connect two passageways 11, through the body 1 and to therefore provide a free communication through that particular valve, for any purpose desired, as for instance, the actuation of a gear shifting member.

The valve 5, being the exception above referred to, and which is intended to be used to secure the reverse movement of the mechanism controlled by the valves, is formed with an annular groove 6, but without the tapered portion shown in the other valves.

Each valve is provided with a spring 12, adapted to hold the valves in raised position, with the communication through the valves cut off, thus holding them in normally closed position.

The numeral 13 designates a slide member, resting on the top of the body 1 and provided with a series of perforations 14, each adapted to register with one of the valve openings in the body 1, and each of these perforations in the slide, with one exception, is formed with a tapered wall 15, adapted to co-act with the tapered grooves in the valves.

The perforation in the slide which registers with the reversing valve 5, however, does not have the tapered wall, but its diameter is the same as the smallest diameter of the tapered openings in the other valves.

A spring 16 tends to hold the slide normally toward what is shown in the drawing as the left side of the body, at which side, I provide a thumb button 17 on the slide, for moving it to the right, against the tension of the spring.

When the slide is in normal position, as shown, the tapered walls of the perforations in the slide bear against the tapered grooves 8 in the valves, and when one of the valves is depressed, as by pressure of the head 4, the action will cause the slide to move to the right, against the tension of the spring 16, and the shoulder 9 of the valve will engage the under side of the slide as soon as it reaches the point where the slide may return after passing the larger portion of the body 3. With the one valve thus depressed, the groove 10 therein will communicate or register with the two ports of the communication 11, as above stated.

When it is desired to open communication through another valve, it will be only necessary to depress that particular valve, and this action will establish communication through the valve, and, at the same time, the act of depressing the second valve, through the movement of the slide 13, will release the first named valve which will be returned to normal or closed position by its backing spring 12.

Referring now to the valve 5, that is, the reversing valve, it will be noted that, in order to actuate this valve, that is, to depress it to the point where communication may be established through it, it will be necessary to first move the slide member, and this can be accomplished by pressing the slide against the tension of the spring 16, and only when the slide has been shifted the full distance of its travel, will it be possible to depress the valve 5, for the reason that there is no tapered surface on either the valve nor the slide, and this construction will positively overcome the danger of accidentally actuating the reverse valve, for it is necessary with my construction, to deliberately prepare for the actuation of the reverse valve before it can be accomplished.

When any one of the valves 3 are in lowered position, the accidental actuation of the valve 5 is almost impossible, since it would first necessitate the movement of the slide 13, by pressure on the button 17.

What I claim is:—

1. In a device of the character described, a body having a plurality of vertically movable valves therein, each of which is capable of actuation at any time, a slide adapted to be moved by the actuation of said valves, and an additional valve which is not operable until the said slide has first been moved to a certain point.

2. A device of the character described comprising a valve engaging slide member, a plurality of vertically movable valves, any one of which is free to be actuated at any time, and an additional valve whose actuation cannot be accomplished until released by said slide member.

3. In a device of the character described, the combination of a body member having a plurality of valve openings and ports leading into said openings, with manually operable valves in said openings, springs to keep the valves normally in closed position, each of said valves having an annular groove; and a slide member formed with perforations whose walls, with one exception, are tapered and adapted to engage the grooves in the valves, said slide being adapted for movement by the actuation of any one of said valves except that one operating in the perforation lacking the tapered walls.

In testimony whereof I affix my signature.

RAYMOND F. LANDIS.